(12) United States Patent
Yang et al.

(10) Patent No.: US 11,587,034 B2
(45) Date of Patent: Feb. 21, 2023

(54) ROBOT-BASED WAREHOUSE ORDER PICKING METHOD, APPARATUS AND SYSTEM, ELECTRONIC DEVICE, AND STORAGE MEDIUM

(71) Applicant: SYRIUS ROBOTICS CO., LTD., Guangdong (CN)

(72) Inventors: Zhiqin Yang, Guangdong (CN); Qi Wan, Guangdong (CN)

(73) Assignee: SYRIUS ROBOTICS CO., LTD., Guangdong (CN)

( * ) Notice: Subject to any disclaimer, the term of this patent is extended or adjusted under 35 U.S.C. 154(b) by 0 days.

(21) Appl. No.: 17/293,931

(22) PCT Filed: Dec. 29, 2018

(86) PCT No.: PCT/CN2018/125142
§ 371 (c)(1),
(2) Date: May 14, 2021

(87) PCT Pub. No.: WO2020/103296
PCT Pub. Date: May 28, 2020

(65) Prior Publication Data
US 2022/0004975 A1    Jan. 6, 2022

(30) Foreign Application Priority Data
Nov. 19, 2018    (CN) .......................... 201811371579.7

(51) Int. Cl.
*G06Q 10/08*    (2012.01)
*G06Q 10/087*    (2023.01)
(Continued)

(52) U.S. Cl.
CPC ......... *G06Q 10/087* (2013.01); *B65G 1/1373* (2013.01); *G05B 19/042* (2013.01);
(Continued)

(58) Field of Classification Search
CPC .............. B65G 2209/06; B65G 1/1373; G06Q 10/087; G05B 2219/32037; G05B 2219/45063; G07F 13/025
(Continued)

(56) References Cited

U.S. PATENT DOCUMENTS 5,505,473 A * 4/1996 Radcliffe ............. B65G 1/1376
340/8.1
7,686,171 B1 * 3/2010 Shakes .................... B07C 7/005
209/583
(Continued)

FOREIGN PATENT DOCUMENTS

CN           2614183 Y      5/2004
CN         205837747 U     12/2016
(Continued)

OTHER PUBLICATIONS

Extend European Search Report cited in 18940891.7 dated Jul. 8, 2022, 12 pages.

*Primary Examiner* — Timothy R Waggoner
(74) *Attorney, Agent, or Firm* — Yu Gang

(57) ABSTRACT

A robot-based electronic commerce warehouse order picking method is provided, box body identity information of a circulation box is acquired and the circulation box and a robot are bound based on the box body identity information, the circulation box includes at least one circulation position, a tag and a goods placement mark are correspondingly arranged at the circulation position, and the box body identity information includes information of the tag and information of the goods placement mark; warehouse order information is acquired and the warehouse order information is associated with the box body identity information to obtain order binding information; an interaction terminal of the robot is controlled according to the order binding information to display an interaction interface to instruct a picker (Continued)

to pick goods at a corresponding goods position and place the goods at the circulation position according to the goods placement mark.

4 Claims, 8 Drawing Sheets

(51) Int. Cl.
   *B65G 1/137* (2006.01)
   *G05B 19/042* (2006.01)
   *G06K 7/14* (2006.01)
(52) U.S. Cl.
   CPC .. *G06K 7/1413* (2013.01); *G05B 2219/32037* (2013.01); *G05B 2219/32392* (2013.01)
(58) Field of Classification Search
   USPC .................................................. 700/215, 236
   See application file for complete search history.

(56) References Cited

U.S. PATENT DOCUMENTS

| | | | | |
|---|---|---|---|---|
| 7,774,243 | B1* | 8/2010 | Antony | G06Q 10/087 53/445 |
| 9,174,800 | B1* | 11/2015 | Curlander | H04N 5/2252 |
| 9,550,624 | B2* | 1/2017 | Khodl | B25J 5/007 |
| 10,121,034 | B1* | 11/2018 | Bathurst | G06K 7/10 |
| 10,558,214 | B2* | 2/2020 | Jaquez | G05D 1/0088 |
| 2013/0317642 | A1* | 11/2013 | Asaria | G06Q 50/28 700/216 |
| 2014/0257553 | A1* | 9/2014 | Shakes | B65G 1/1373 700/216 |
| 2015/0032252 | A1* | 1/2015 | Galluzzo | G05D 1/0248 700/218 |
| 2016/0236869 | A1 | 8/2016 | Kimura et al. | |
| 2017/0158431 | A1* | 6/2017 | Hamilton | G05B 19/41895 |
| 2017/0261992 | A1 | 9/2017 | Johnson et al. | |
| 2018/0059635 | A1 | 3/2018 | Johnson et al. | |
| 2018/0211347 | A1 | 7/2018 | Chen et al. | |
| 2018/0215544 | A1 | 8/2018 | High et al. | |
| 2018/0330325 | A1 | 11/2018 | Sibley | |

FOREIGN PATENT DOCUMENTS

| | | |
|---|---|---|
| CN | 107215520 A | 9/2017 |
| CN | 107578201 A | 1/2018 |
| CN | 207046296 U | 2/2018 |
| CN | 107977813 A | 5/2018 |
| CN | 108107862 A | 6/2018 |
| CN | 108470260 A | 8/2018 |
| EP | 3309725 A1 | 4/2018 |
| JP | 05008583 U | 2/1993 |
| JP | 2010146210 A | 7/2010 |
| JP | 2015148700 A | 8/2015 |

* cited by examiner

ROBOT-BASED WAREHOUSE ORDER PICKING METHOD, APPARATUS AND SYSTEM, ELECTRONIC DEVICE, AND STORAGE MEDIUM

TECHNICAL FIELD

The present disclosure belongs to the technical field of logistics robots, and particularly to a robot-based electronic commerce warehouse order picking method, apparatus and system, an electronic device, and a storage medium.

BACKGROUND

With the popularization of the Internet and mobile terminals, consumption habits of consumers have changed greatly, and shopping anytime and anywhere at high frequencies has become a mainstream online shopping manner. Shopping anytime and anywhere at high frequencies usually has the characteristics of small sizes of ordered goods and high ordering frequency, and this characteristics cause picking problems of "goods ordered at high frequencies and having small sizes" in logistics management.

For solving the picking problems of "goods ordered at high frequencies and having small sizes", a picking method in the related art is as follows: a warehouse management system combines multiple orders into a large goods picking task according to a certain rule and assigns the large goods picking task to a single picker; the picker, after receiving the large goods picking task, completes the large goods picking task in a single round trip and gives the large goods picking task to a sorter; and the sorter splits the large goods picking task into the multiple orders that are combined according to the warehouse management system for packaging and delivery.

Although a purpose of packaging and delivery can be achieved by the picking method in the related art for the picking problems of "goods ordered at high frequencies and having small sizes", this picking method has the defects of complex logistics process and low sorting efficiency.

In summary, the picking method in the related art has the technical problems of low warehouse delivery efficiency and unadaptability to picking requirements of "goods ordered at high frequencies and having small sizes" in an electronic commerce environment.

SUMMARY

In view of the above, embodiments of the present disclosure provide a robot-based warehouse order picking method, apparatus and system, an electronic device, and a storage medium, which can solve the technical problems, in a picking method in the related art, of low warehouse delivery efficiency and unadaptability to picking requirements of "goods ordered at high frequencies and having small sizes" in an electronic commerce environment.

In order to solve the above technical problem, an aspect of the embodiments of the present disclosure provides a robot-based warehouse order picking method, which is described as follows.

The robot-based warehouse order picking method includes the following operations.

A circulation box and a robot are bound by means of acquiring box body identity information of the circulation box including at least one circulation position, wherein a tag and a goods placement mark are correspondingly arranged at the circulation position, and the box body identity information includes information of the tag and information of the goods placement mark.

Warehouse order information is acquired and the warehouse order information is associated with the box body identity information to obtain order binding information.

An interaction terminal of the robot is controlled according to the order binding information to display an interaction interface to instruct a picker to pick goods at a corresponding goods position and place the goods at the circulation position according to the goods placement mark.

The embodiments of the present disclosure also provide an electronic device, which includes a memory and a processor. The memory stores a computer program, and the processor is configured to execute the computer program to implement any abovementioned method.

The embodiments of the present disclosure also provide a storage medium, which stores a computer program. The computer program is executed in a processor to implement any abovementioned method.

The embodiments of the present disclosure also provide a robot-based warehouse order picking apparatus, which includes:

a binding module, configured to bind a circulation box and a robot by means of acquiring box body identity information of the circulation box including at least one circulation position, wherein a tag and a goods placement mark are correspondingly arranged at the circulation position, and the box body identity information includes information of the tag and information of the goods placement mark;

an association module, configured to acquire warehouse order information and associate the warehouse order information with the box body identity information to obtain order binding information; and an interface interaction module, configured to control, according to the order binding information, an interaction terminal of the robot to display an interaction interface to instruct a picker to pick goods at a corresponding goods position and place the goods at the circulation position according to the goods placement mark.

According to the robot-based warehouse order picking method provided in embodiments of the present disclosure, a circulation box and a robot are bound by means of acquiring box body identity information of the circulation box including at least one circulation position, wherein a tag and a goods placement mark are correspondingly arranged at the circulation position and the box body identity information includes information of the tag and information of the goods placement mark; then warehouse order information is acquired and the warehouse order information is associated with the box body identity information to obtain the order binding information; and an interaction terminal of the robot is controlled according to the order binding information to display an interaction interface to instruct the picker to pick goods at the corresponding goods position and place the goods at the circulation position according to the goods placement mark. In such a manner, a picking region is directly connected with a packaging region, and arrangement of an additional sorting region is avoided, so that not only technical effects of simplifying logistics procedures and improving the logistics efficiency are achieved, but also a purpose of reducing the logistics cost is achieved.

DETAILED DESCRIPTION OF THE EMBODIMENTS

In order to make the objectives, technical solutions and advantages of the present disclosure clearer, the following further describes the present disclosure in detail with reference to the drawings and embodiments. It should be understood that, in the descriptions of the present disclosure, unless otherwise clearly specified and limited, term "storage medium" may be various media capable of storing computer programs, such as a Read-Only Memory (ROM), a Random Access Memory (RAM), a magnetic disk, or an optical disk. Term "processor" may be a chip or circuit with a data processing function, such as a Complex Programmable Logic Device (CPLD), a Field-Programmable Gate Array (FPGA), a Microcontroller Unit (MCU), a Programmable Logic Controller (PLC), and a Central Processing Unit (CPU). Term "electronic device" may be any device with the data processing function and a storage function, and may usually include a fixed terminal and a mobile terminal. The fixed terminal is, for example, a desktop computer. The mobile terminal is, for example, a mobile phone, a PAD, and a mobile robot. In addition, the technical features involved in different implementations of the embodiments of the present disclosure described later can be combined with each other as long as they do not conflict with each other.

In the following, some exemplary embodiments are provided with reference to the related art to teach those having ordinary skill in the art to implement the technical solution of the embodiments of the present disclosure. A robot system may be selected as an execution body to implement method operations in the exemplary embodiments.

Figure 1:
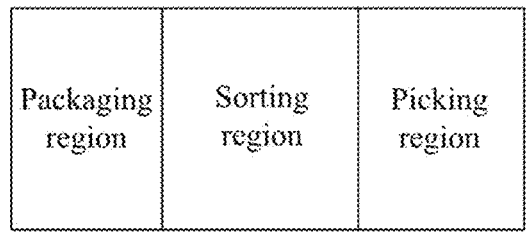
FIG. 1 is a schematic scenario diagram of a picking method in the related art.

Referring to FIG. 1, in the related art, a warehouse management system combines multiple orders into a large goods picking task according to a certain rule and assigns the large goods picking task to a single picker; the picker, after receiving the large goods picking task, completes the large goods picking task in a single round trip and gives the large goods picking task to a sorter; and the sorter splits the large goods picking task into the multiple orders that are combined according to the warehouse management system for packaging and delivery. However, the following problems remain to be solved.

First, workers travel between a sorting region and a picking region to transfer goods, so that the logistics efficiency is low.

Second, existence of the sorting region makes logistics procedures complex, not only reduces the logistics cost, but also causes low logistics efficiency.

Figure 2:
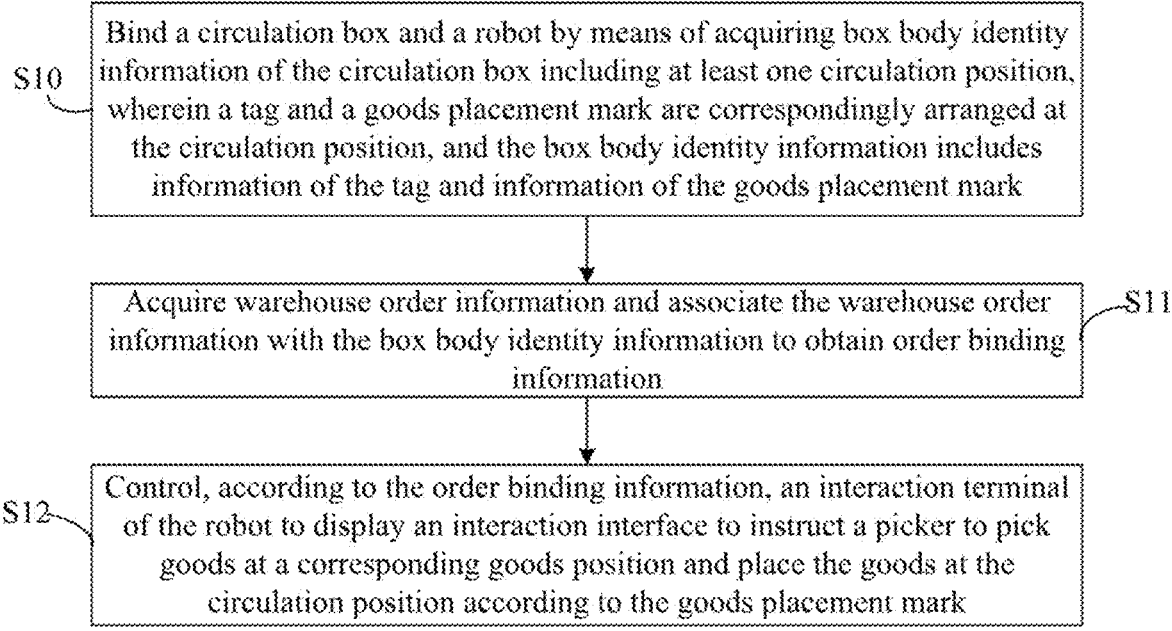
FIG. 2 is a flowchart of a robot-based warehouse order picking method according to an embodiment.

FIG. 2 is a flowchart of a robot-based warehouse order picking method according to an embodiment. The robot-based warehouse order picking method shown in FIG. 2 can solve the above technical problems.

Referring to FIG. 2 and FIG. 10 to FIG. 14, the robot-based warehouse order picking method includes the following operations.

In operation S10, a circulation box and a robot are bound by means of acquiring box body identity information of the circulation box including at least one circulation position. Herein, a tag and a goods placement mark are correspondingly arranged at the circulation position, and the box body identity information includes information of the tag and information of the goods placement mark.

In operation S11, warehouse order information is acquired and the warehouse order information is associated with the box body identity information to obtain order binding information.

In operation S12, an interaction terminal of the robot is controlled according to the order binding information to display an interaction interface to instruct a picker to pick goods at a corresponding goods position and place the goods at the circulation position according to the goods placement mark.

In the embodiment, a circulation box 1002 and a robot are bound by means of acquiring box body identity information of the circulation box 1002 including at least one circulation position, wherein a tag 2003 and a goods placement mark (2001, 2002) are correspondingly arranged at the circulation position and the box body identity information includes information of the tag 2003 and information of the goods placement mark (2001, 2002); then warehouse order information is acquired and the warehouse order information is associated with the box body identity information to obtain the order binding information; and an interaction terminal of the robot is controlled according to the order binding information to display an interaction interface to instruct the picker to pick goods at the corresponding goods position and place the goods at the circulation position according to the goods placement mark (2001, 2002). In such a manner, a picking region is directly connected with a packaging region, and arrangement of an additional sorting region is avoided, so that not only technical effects of simplifying logistics procedures and improving the logistics efficiency are achieved, but also a purpose of reducing the logistics cost is achieved.

It is to be noted that, in operation S10, there is a mapping relationship between a robot system and the robot, namely identity information of the robot can be accessed and acquired by the robot system, so that the robot system, after acquiring the box body identity information of the circulation box 1002 including the at least one circulation position, can bind the box body identity information and the identity information of the robot.

In addition, the tag 2003 and the goods placement mark (2001, 2003) are correspondingly arranged at the circulation position, and the box body identity information includes the information of the tag 2003 and the information of the goods placement mark (2001, 2002), so that the robot system may access and acquire the information of the tag 2003 and the information of the goods placement mark (2001, 2002). Meanwhile, there is a corresponding relationship between the tag 2003 and the goods placement mark (2001, 2002), so that the information of the circulation box and the information of the robot can be bound based on the information of the tag 2003 and the information of the goods placement mark (2001, 2002).

Moreover, the goods placement mark (2001, 2002) may be implemented by a serial number 2002 and a distinct mark 2001 corresponding to the serial number 2002. The distinct mark 2001 may be a pattern, a color, a shape, and a combination thereof. The goods placement mark (2001, 2002) is used to indicate a placement position of the goods.

Furthermore, the tag 2003 includes, but is not limited to, a two-dimensional code. Each tag 2003 is used to uniquely identify a circulation position of the circulation box 1002, and the circulation position is used to place goods. In an exemplary embodiment, the circulation positions are distributed on a box body of the circulation box 1002 in the form of a matrix. If the tag 2003 is embodied as a two-dimensional code, a corresponding number of two-dimensional codes, for example, eight two-dimensional codes, are arranged at multiple circulation positions distributed on the box body of the circulation box 1002 in the form of a matrix.

It is to be noted that, in operation S11, the robot system may acquire the warehouse order information reflecting information about the goods from a warehouse management system and associate the warehouse order information with the box body identity information to obtain the order binding information. The information about the goods includes, but is not limited to, goods information and goods position information. The robot system may access and acquire the order binding information to find by mapping the goods position corresponding to the goods in a logistics warehouse and a corresponding circulation position on the circulation box 1002.

It is to be noted that, in operation S12, the goods placement mark (2001, 2002) corresponds to the circulation position of the circulation box 1002, the circulation position of the circulation box 1002 corresponds to the tag 2003 (for example, the two-dimensional code), and the information of the tag 2003 corresponds to the warehouse order information, so that the robot system controls, according to the order binding information, the interaction terminal of the robot to display the interaction interface, and the picker may be instructed through the interaction interface to pick the goods at corresponding goods position and place the goods at the circulation position according to the goods placement mark (2001, 2002).

It is to be noted that a code scanner 1005, an interaction terminal 1001, a pallet 1003 and a moving base 1004 may be arranged on a body of the robot. The code scanner 1005 is configured to scan the tag 2003 or scan a barcode of the goods. The pallet 1003 is configured to place the circulation box 1002.

Figure 3:
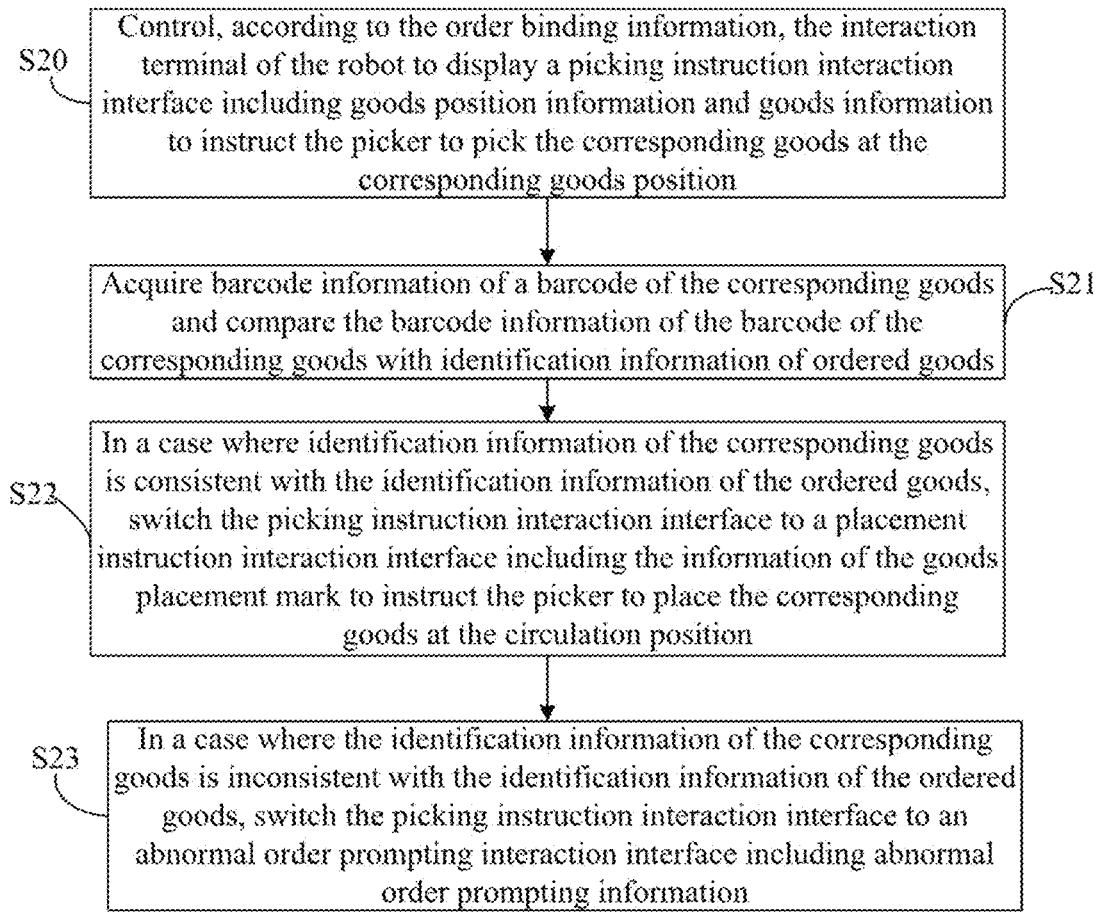
FIG. 3 is a flowchart of an exemplary method for an operation in FIG. 2 according to an embodiment.

FIG. 3 shows an exemplary method for an operation in FIG. 2 according to an embodiment.

Referring to FIG. 3 and FIG. 10 to FIG. 14, the operation that the interaction terminal of the robot is controlled according to the order binding information to display the interaction interface to instruct the picker to pick the goods at the corresponding goods position and place the goods at the circulation position according to the goods placement mark includes the following operations.

In operation S20, the interaction terminal of the robot is controlled according to the order binding information to display a picking instruction interaction interface including goods position information and goods information to instruct the picker to pick the corresponding goods at the corresponding goods position.

In operation S21, barcode information of a barcode of the corresponding goods is acquired and the barcode information of the barcode of the corresponding goods is compared with identification information of ordered goods.

In operation S22, in a case where identification information of the corresponding goods is consistent with the identification information of the ordered goods, the picking instruction interaction interface is switched to a placement instruction interaction interface including the information of the goods placement mark to instruct the picker to place the corresponding goods at the circulation position.

In operation S23, in a case where the identification information of the corresponding goods is inconsistent with the identification information of the ordered goods, the picking instruction interaction interface is switched to an abnormal order prompting interaction interface including abnormal order prompting information.

It is to be noted that each of the identification information of the corresponding goods and the identification information of the ordered goods may include, but is not limited to, barcode information of the goods.

It is to be noted that, in operation S20, the robot system may control, according to the order binding information, the interaction terminal 1001 of the robot to display the picking instruction interaction interface including the goods position information 3103 and the goods information 3104 to instruct the picker to pick the corresponding goods at the corresponding goods position, so that the picker may have clear knowledge of the picking task to further improve the picking efficiency. The interaction terminal 1001 of the robot may be a fixed device, or may be a mobile device.

In addition, information required to be displayed on the instruction interaction interface only includes the goods position information 3103 and the goods information 3104, so that data processing and display control tasks for the robot system are reduced, thereby improving the processing efficiency and the display efficiency. Of course, the information displayed on the instruction interaction interface may further include other information, such as user information 3101, goods type information 3107, information 3105 of the number of goods to be picked, operating information 3102 and a toggle button 3106.

It is to be noted that, in operations S21, S22 and S23, when the robot system switches the picking instruction interaction interface to the placement instruction interaction interface including the information 3201 of the goods placement mark (2001, 2002) in a case where the identification information of the corresponding goods is consistent with the identification information of the ordered goods, the switching may be automatically controlled, or the switching may be triggered by pressing a toggle button 3203 controlled to be generated. Multiple interaction manners are provided to meet specific requirements of a user. The placement instruction interaction interface may further include information 3202 of the number of goods to be placed, information 3204 of the number of placed goods, etc.

In addition, the picking instruction interaction interface and the placement instruction interaction interface are displayed in separate pages, so that picking and placement may be distinguished obviously, and the corresponding display information may be as clear and distinctive as possible and convenient for the picker to recognize for faster picking and placement, thereby improving the picking efficiency.

Besides, the robot system may judge by comparison the consistency of the identification information of the corresponding goods and the identification information of the ordered goods to confirm whether the ordered goods are consistent with the practically picked goods or not, so that a warehouse order may be checked and judged.

Moreover, an abnormal order refers to a warehouse order that may have wrong recorded information.

Furthermore, switching the picking instruction interaction interface to the abnormal order prompting interaction interface including the abnormal order prompting information may avoid the picker placing practically picked goods inconsistent with ordered goods.

Figure 4:
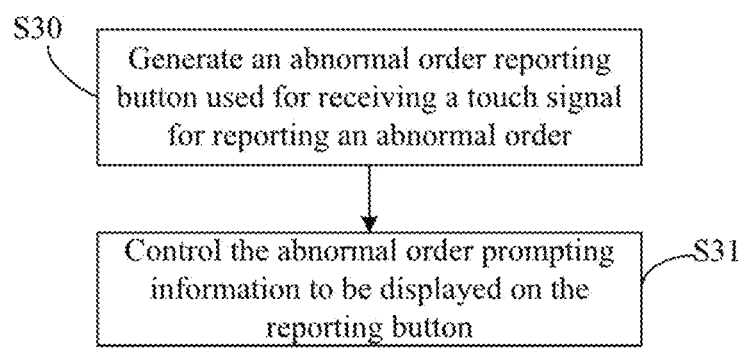
FIG. 4 is a flowchart of an exemplary method for an operation in FIG. 3 according to an embodiment.

FIG. 4 shows an exemplary method for an operation in FIG. 3 according to an embodiment.

Referring to FIG. 4 and FIG. 10 to FIG. 14, the operation that the picking instruction interaction interface is switched to the abnormal order prompting interaction interface including the abnormal order prompting information includes the following operations.

In operation S30, an abnormal order reporting button used for receiving a touch signal for reporting an abnormal order is generated.

In operation S31, the abnormal order prompting information is controlled to be displayed on the reporting button.

It is to be noted that the robot system controls the abnormal order prompting interaction interface to generate the abnormal order reporting button 3301 and controls the abnormal order prompting information to be displayed on the reporting button 3301, thereby implementing statistical feedback of abnormal orders reported by pickers to the warehouse management system.

In addition, the abnormal order prompting interaction interface may include a toggle button 3306 for the user to select to switch the interaction interface.

Figure 5:
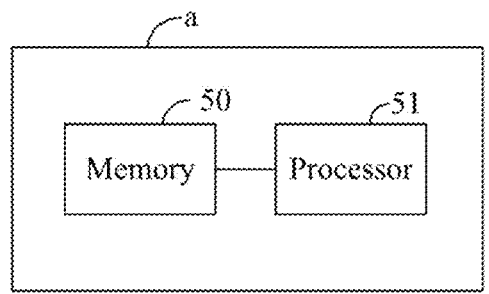
FIG. 5 is a structural diagram of an electronic device according to an embodiment.

FIG. 5 is a structural diagram of an electronic device according to an embodiment, and shows an electronic device.

Referring to FIG. 5, an electronic device a includes a memory 50 and a processor 51, wherein the memory 50 stores a computer program, and the processor is configured to execute the computer program 51 to implement any method in FIG. 2 to FIG. 4.

In an embodiment, there is also provided a storage medium, which stores a computer program, wherein the computer program is executed in a processor to implement any method in FIG. 2 to FIG. 4.

Figure 6:
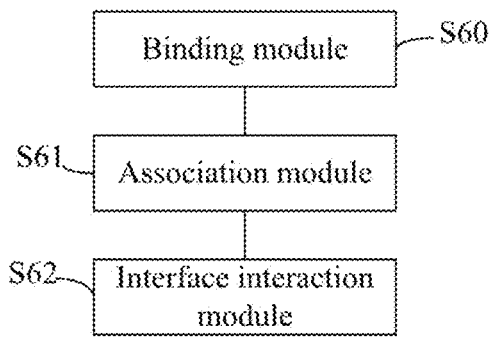
FIG. 6 is a schematic structural diagram of a robot-based warehouse order picking apparatus according to an embodiment.

FIG. 6 is a schematic structural diagram of a robot-based warehouse order picking apparatus according to an embodiment, and shows a robot-based warehouse order picking apparatus.

Referring to FIG. 6, the robot-based warehouse order picking apparatus includes:

a binding module 60, configured to bind a circulation box 1002 and a robot by means of acquiring box body identity information of the circulation box 1002 including at least one circulation position, wherein a tag 2003 and a goods placement mark (2001, 2002) are correspondingly arranged at the circulation position and the box body identity information includes information of the tag 2003 and information 3201 of the goods placement mark (2001, 2002);

an association module 61, configured to acquire warehouse order information and associate the warehouse order information with the box body identity information to obtain order binding information; and an interface interaction module 62, configured to control, according to the order binding information, an interaction terminal 1001 of the robot to display an interaction interface to instruct a picker to pick goods at a corresponding goods position and place the goods at the circulation position according to the goods placement mark (2001, 2002).

It is to be noted that, the provided robot-based warehouse order picking apparatus follows the same inventive concept of the robot-based warehouse order picking method, and technical features in the method embodiment are also applied to the apparatus embodiment and will not be elaborated herein.

Figure 7:
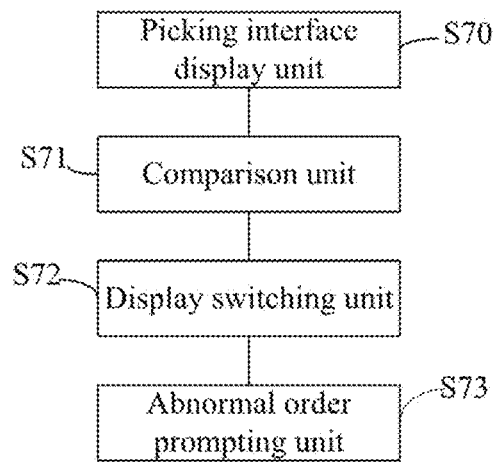
FIG. 7 is a schematic structural diagram of an interface interaction module in FIG. 6 according to an embodiment.

FIG. 7 is a schematic structural diagram of an interface interaction module in FIG. 6 according to an embodiment, and shows an interface interaction module.

Referring to FIG. 7, the interface interaction module includes:

a picking interface display unit 70, configured to control, according to the order binding information, the interaction terminal 1001 of the robot to display a picking instruction interaction interface including goods position information 3103 and goods information 3104 to instruct the picker to pick the corresponding goods at the corresponding goods position;

a comparison unit 71, configured to acquire barcode information of a barcode of the corresponding goods and compare the barcode information of the barcode of the corresponding goods with identification information of ordered goods; and a display switching unit 72, configured to, in a case where identification information of the corresponding goods is consistent with the identification information of the ordered goods, switch the picking instruction interaction interface to a placement instruction interaction interface including the information 3201 of the goods placement mark (2001, 2002) to instruct the picker to place the corresponding goods at the circulation position.

Furthermore, the interface interaction module further includes:

an abnormal order prompting unit 73, configured to, in a case where the identification information of the corresponding goods is inconsistent with the identification information of the ordered goods, switch the picking instruction interaction interface to an abnormal order prompting interaction interface including abnormal order prompting information.

It is to be noted that a robot system may control, according to the order binding information, the interaction terminal 1001 of the robot to display the picking instruction interaction interface including the goods position information 3103 and the goods information 3104 to instruct the picker to pick the corresponding goods at the corresponding goods position, so that the picker may have clear knowledge of the picking task to further improve the picking efficiency. The interaction terminal 1001 of the robot may be a fixed device, or may be a mobile device.

In addition, information required to be displayed on the instruction interaction interface only includes the goods position information 3103 and the goods information 3104, so that data processing and display control tasks for the robot system are reduced, thereby improving the processing efficiency and the display efficiency. Of course, the information displayed on the instruction interaction interface may further include other information, such as user information 3101, goods type information 3107, information 3105 of the number of goods to be picked, operating information 3102 and a toggle button 3106.

It is to be noted that, when the robot system switches the picking instruction interaction interface to the placement instruction interaction interface including the information 3201 of the goods placement mark (2001, 2002) in a case where the identification information of the corresponding goods is consistent with the identification information of the ordered goods, switching may be automatically controlled, or the switching may be triggered by pressing a toggle button 3203 controlled to be generated. Multiple interaction manners are provided to meet specific requirements of a user. The placement instruction interaction interface may further include information 3202 of the number of goods to be placed, information 3204 of the number of placed goods, etc.

In addition, the picking instruction interaction interface and the placement instruction interaction interface are displayed in separate pages, so that picking and placement may be distinguished obviously, and the corresponding display information may be as clear and distinctive as possible and convenient for the picker to recognize for faster picking and placement, thereby improving the picking efficiency.

Besides, the robot system may judge by comparison the consistency of the identification information of the corresponding goods and the identification information of the ordered goods to confirm whether the ordered goods are consistent with the practically picked goods or not, so that a warehouse order may be checked and judged.

Moreover, an abnormal order refers to a warehouse order that may have wrong recorded information.

Furthermore, switching the picking instruction interaction interface to the abnormal order prompting interaction interface including the abnormal order prompting information may avoid the picker placing practically picked goods inconsistent with ordered goods.

Figure 8:
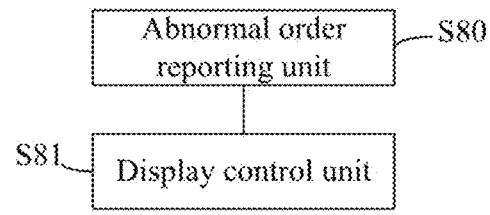
FIG. 8 is a schematic structural diagram of an abnormal order prompting unit in FIG. 7 according to an embodiment.

FIG. 8 is a schematic structural diagram of an abnormal order prompting unit in FIG. 7 according to an embodiment, and shows an abnormal order prompting unit.

Referring to FIG. 8, the abnormal order prompting unit includes:

an abnormal order reporting unit 80, configured to generate an abnormal order reporting button 3301 used for receiving a touch signal for reporting an abnormal order; and a display control unit 81, configured to control the abnormal order prompting information to be displayed on the reporting button 3301.

It is to be noted that the robot system controls the abnormal order prompting interaction interface to generate the abnormal order reporting button 3301 and controls the abnormal order prompting information to be displayed on the reporting button 3301, thereby implementing statistical feedback of abnormal orders reported by pickers to the warehouse management system.

In addition, the abnormal order prompting interaction interface may include a toggle button 3306 for the user to select to switch the interaction interface.

Figure 9:
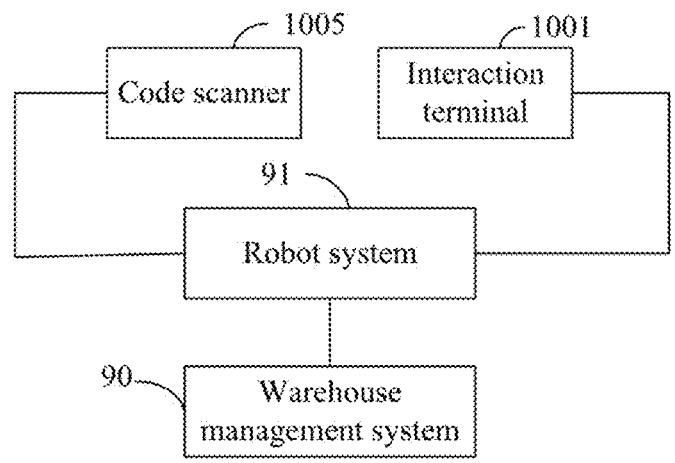
FIG. 9 is a structural diagram of a robot-based warehouse order picking system according to an embodiment.
Figure 10:
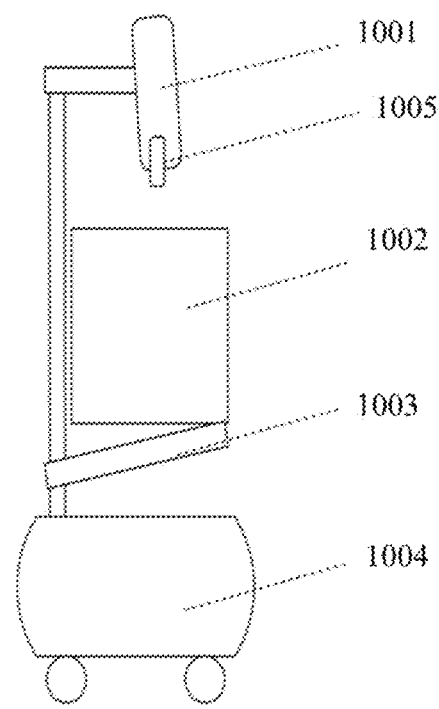
FIG. 10 is a schematic structural diagram of a robot in FIG. 2.
Figure 11:
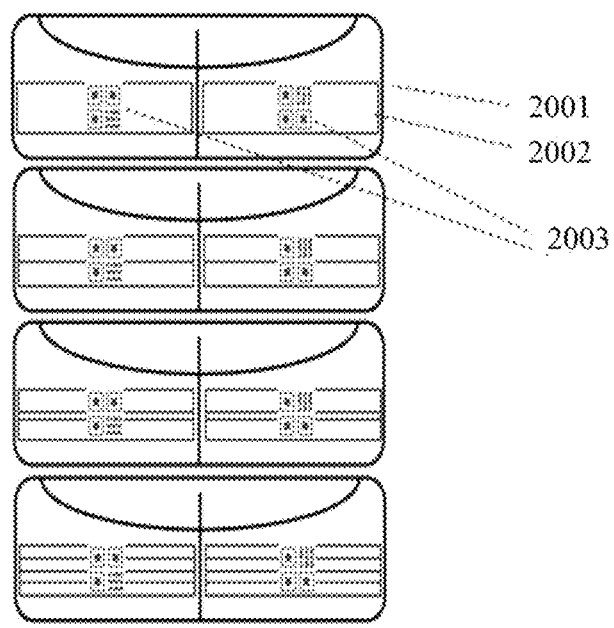
FIG. 11 is a schematic structural diagram of a circulation box in FIG. 2.
Figure 12:
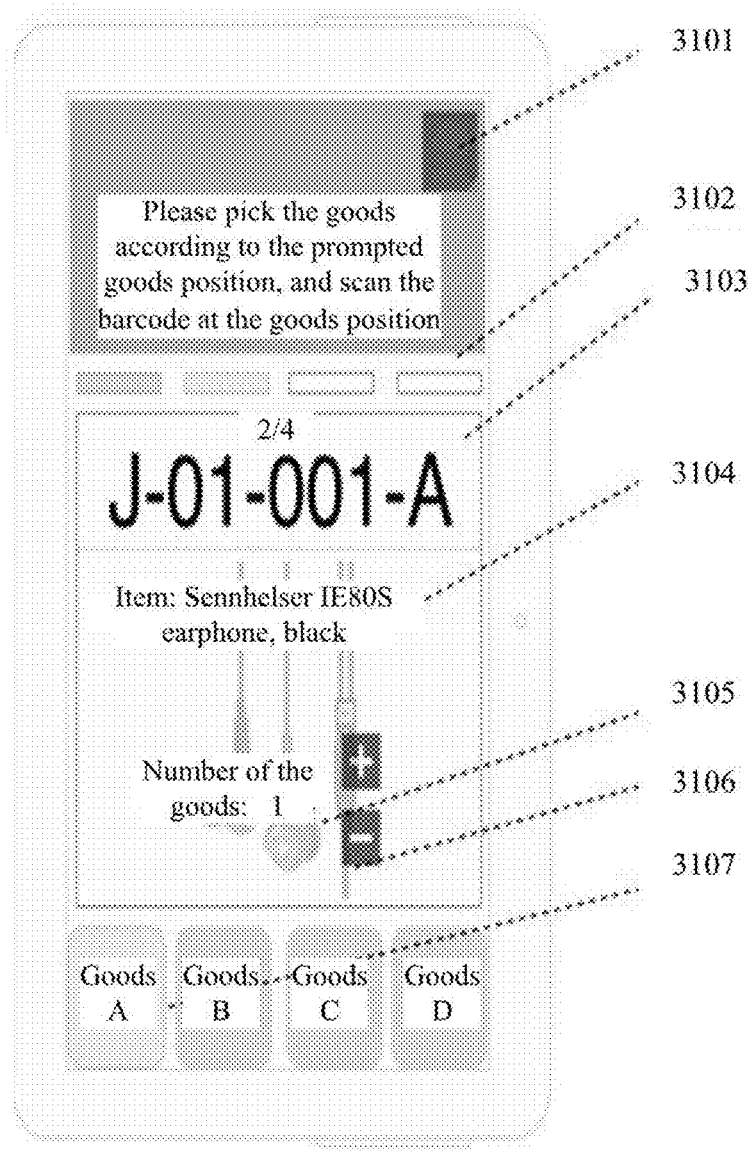
FIG. 12 is a state diagram of a picking instruction interaction interface in FIG. 3.
Figure 13:
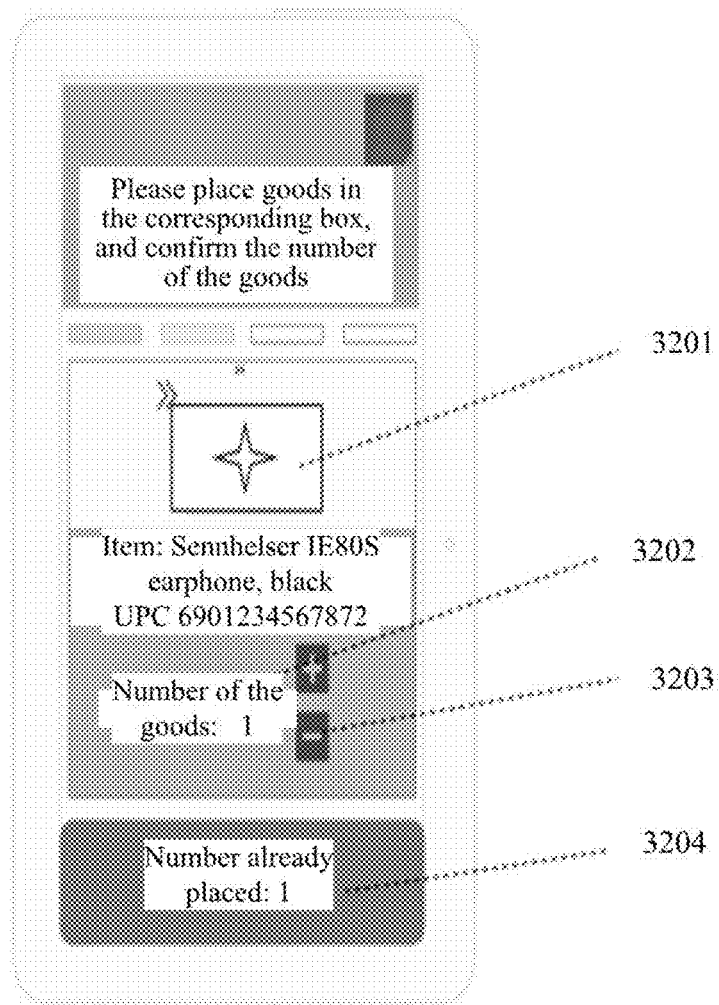
FIG. 13 is a state diagram of a placement instruction interaction interface in FIG. 3.
Figure 14:
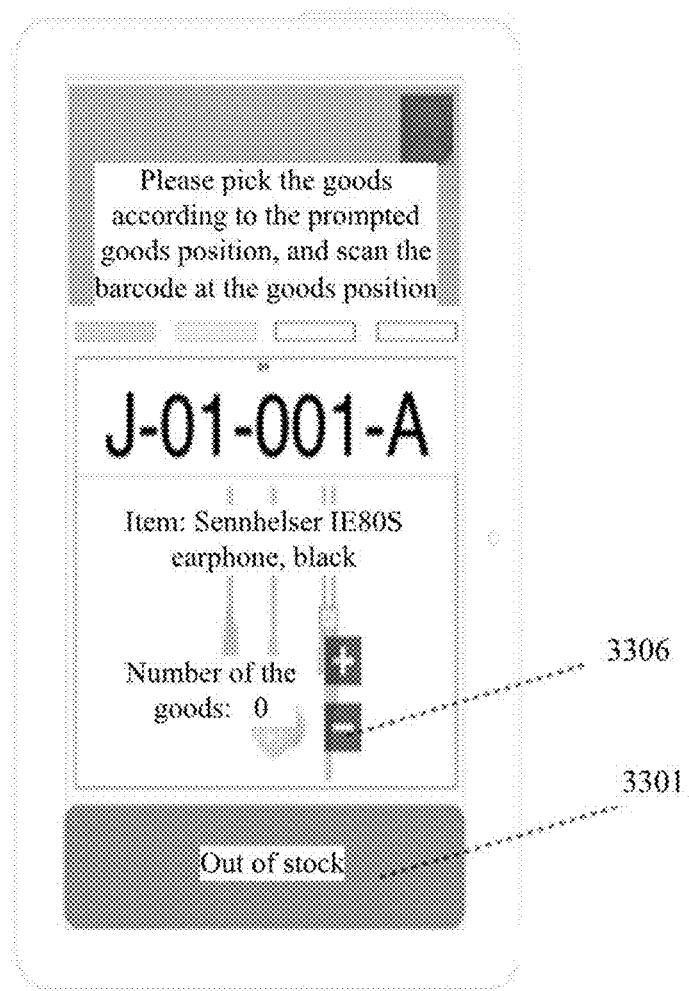
FIG. 14 is a state diagram of an abnormal order prompting interaction interface in FIG. 3.

FIG. 9 is a structural diagram of a robot-based warehouse order picking system according to an embodiment, and shows a robot-based warehouse order picking system.

Referring to FIG. 9, a robot-based warehouse order picking system includes:

a warehouse management system 90, configured to manage warehouse orders and record warehouse order information; and a robot system 91, in communication connection with the warehouse management system.

The robot system is configured to bind a circulation box 1002 and a robot by means of acquiring box body identity information of the circulation box 1002 including at least one circulation position, wherein a tag 2003 and a goods placement mark (2001, 2002) are correspondingly arranged at the circulation position and the box body identity information includes information of the tag 2003 and information 3201 of the goods placement mark (2001, 2002).

The robot system is further configured to acquire warehouse order information and associate the warehouse order information with the box body identity information to obtain order binding information.

The robot system is further configured to control, according to the order binding information, an interaction terminal 1001 of the robot to display an interaction interface to instruct a picker to pick goods at a corresponding goods position and place the goods at the circulation position according to the goods placement mark (2001, 2002).

The robot system communicates with a code scanner 1005 to receive the information of the tag 2003 and barcode information of the goods. The robot system communicates with the interaction terminal 1001.

In the embodiment, the box body identity information of the circulation box 1002 including the at least one circulation position is acquired so that the circulation box 1002 and the robot are bound, wherein the tag 2003 and the goods placement mark (2001, 2002) are correspondingly arranged at the circulation position and the box body identity information includes the information of the tag 2003 and the information of the goods placement mark (2001, 2002); then warehouse order information is acquired and the warehouse order information is associated with the box body identity information to obtain the order binding information; and an interaction terminal of the robot is controlled according to the order binding information to display an interaction interface to instruct the picker to pick goods at the corresponding goods position and place the goods at the circulation position according to the goods placement mark (2001, 2002). In such a manner, a picking region is directly connected with a packaging region, and arrangement of an additional sorting region is avoided, so that not only technical effects of simplifying logistics procedures and improving the logistics efficiency are achieved, but also a purpose of reducing the logistics cost is achieved.

It is to be noted that there is a mapping relationship between the robot system and the robot, namely identity information of the robot can be accessed and acquired by the robot system, so that the robot system, after acquiring the box body identity information of the circulation box 1002 including the at least one circulation position, can bind the box body identity information and the identity information of the robot.

In addition, the tag 2003 and the goods placement mark (2001, 2003) are correspondingly arranged at the circulation position, and the box body identity information includes the information of the tag 2003 and the information of the goods placement mark (2001, 2002), so that the robot system may access and acquire the information of the tag 2003 and the information of the goods placement mark (2001, 2002). Meanwhile, there is a corresponding relationship between the tag 2003 and the goods placement mark (2001, 2002), so that the information of the circulation box and the information of the robot can be bound based on the information of the tag 2003 and the information of the goods placement mark (2001, 2002).

Moreover, the goods placement mark (2001, 2002) may be implemented by a serial number 2002 and a distinct mark 2001 corresponding to the serial number 2002. The distinct mark 2001 may be a pattern, a color, a shape, and a combination thereof. The goods placement mark (2001, 2002) is used to indicate a placement position of the goods.

Furthermore, the tag 2003 includes, but is not limited to, a two-dimensional code. Each tag 2003 is used to uniquely identify a circulation position of the circulation box 1002, and the circulation position is used to place goods. In an exemplary embodiment, the circulation positions are distributed on a box body of the circulation box 1002 in the form of a matrix. If the tag 2003 is embodied as a two-dimensional code, a corresponding number of two-dimensional codes, for example, eight two-dimensional codes, are arranged at multiple circulation positions distributed on the box body of the circulation box 1002 in the form of a matrix.

It is to be noted that the robot system may acquire the warehouse order information reflecting information about the goods from a warehouse management system and associate the warehouse order information with the box body identity information to obtain the order binding information. The information about the goods includes, but is not limited to, goods information and goods position information. The robot system may access and acquire the order binding information to find by mapping the goods position corresponding to the goods in a logistics warehouse and a corresponding circulation position on the circulation box 1002.

It is to be noted that the goods placement mark (2001, 2002) corresponds to the circulation position of the circulation box 1002, the circulation position of the circulation box 1002 corresponds to the tag 2003 (for example, the two-dimensional code), and the information of the tag 2003 corresponds to the warehouse order information, so that the robot system controls, according to the order binding information, the interaction terminal of the robot to display the interaction interface, and the picker may be instructed through the interaction interface to pick the goods at corresponding goods position and place the goods at the circulation position according to the goods placement mark (2001, 2002).

It is to be noted that a code scanner 1005, an interaction terminal 1001, a pallet 1003 and a moving base 1004 may be arranged on a body of the robot. The code scanner 1005 is configured to scan the tag 2003 or scan a barcode of the goods. The pallet 1003 is configured to place a turnover box 1002.

The above descriptions are only the exemplary embodiments of the present disclosure and are not intended to limit the present disclosure. Any modification, equivalent replacement and improvement made within the principle of the present disclosure shall be included in the protection scope of the present disclosure.

INDUSTRIAL APPLICABILITY

According to the robot-based warehouse order picking method provided in the embodiments of the present disclosure, a circulation box and a robot are bound by means of acquiring box body identity information of the circulation box including at least one circulation position, wherein a tag and a goods placement mark are correspondingly arranged at the circulation position and the box body identity information includes information of the tag and information of the goods placement mark; then warehouse order information is acquired and the warehouse order information is associated with the box body identity information to obtain the order binding information; and an interaction terminal of the robot is controlled according to the order binding information to display an interaction interface to instruct the picker to pick goods at the corresponding goods position and place the goods at the circulation position according to the goods placement mark. In such a manner, a picking region is directly connected with a packaging region, and arrangement of an additional sorting region is avoided, so that not only technical effects of simplifying logistics procedures and improving the logistics efficiency are achieved, but also a purpose of reducing the logistics cost is achieved.

What is claimed is:

1. A robot-based warehouse order picking method, wherein a robot has an interaction terminal and drives a circulation box to move, and the method comprises:
    acquiring box body identity information of the circulation box and binding the circulation box and the robot based on the acquired box body identity information, wherein the circulation box comprises multiple circulation positions, a tag and a goods placement mark are correspondingly arranged at each of the multiple circulation positions, the goods placement mark comprises a serial number and a distinct mark corresponding to the serial number, the distinct mark is pattern, shape or combination of pattern, color and shape, and the box body identity information comprises information of the tag and information of the goods placement mask;
    acquiring warehouse order information and associating the warehouse order information with the box body identity information to obtain order binding information; and
    controlling, according to the order binding information, the interaction terminal of the robot to display an interaction interface comprising the information of the goods placement mark to instruct a picker to pick goods at a corresponding goods position and place the goods at the circulation position according to the goods placement mark, wherein controlling, according to the order binding information, the interaction terminal of the robot to display the interaction interface comprising the information of the goods placement mark to instruct the picker to pick goods at tele corresponding goods position and place the goods at the circulation position according to the goods placement mark comprises:
    controlling, according to the order binding information, the interaction terminal of the robot to display a picking instruction interaction interface comprising goods position information and goods information to instruct the picker to pick the corresponding goods at the corresponding goods position;
    acquiring identification information of the corresponding goods and compare the identification information of the corresponding goods with identification information of ordered goods; and
    in a case where the identification information of the corresponding goods is consistent with the identification information of the ordered goods, switching the picking instruction interaction interface to a placement instruction interaction interface comprising the information of the goods placement mark to instruct the picker to place the corresponding goods at the circulation position at which the displayed goods placement mark is arranged;
    wherein after acquiring the identification information of the corresponding goods and comparing the identification information of the corresponding goods with the identification information of the ordered goods, further comprising:
    in a case where the identification information of the corresponding goods is inconsistent with the identification information of the ordered goods, switching the picking instruction interaction interface to an abnormal order prompting interaction interface comprising abnormal order prompting information; switching the picking instruction interaction interface to the abnormal order prompting interaction interface comprising the abnormal order prompting information comprises: generating an abnormal order reporting button used for receiving a touch signal for reporting an abnormal order; and controlling the abnormal order prompting information to be displayed on the reporting button.

2. A non-transitory computer-readable storage medium, storing a computer program, wherein the computer program is executed in a processor to implement the method according to claim 1.

3. An electronic device, comprising a memory and a processor, wherein the memory stores a computer program, and the processor is configured to execute the computer program to implement the method according to claim 1.

4. A robot-based warehouse order picking apparatus, wherein a robot has an interaction terminal and drives a circulation box to move, and the apparatus comprises a memory storing instructions and a processor in communication with the memory, wherein the processor is configured to execute the instructions to:

acquire box body identity information of the circulation box and bind the circulation box and the robot based on the acquired box body identity, wherein the circulation box comprises multiple circulation positions, a tag and a goods placement mark are correspondingly arranged at each of the multiple circulation positions, the goods placement mark comprises a serial number and a distinct mark corresponding to the serial number, the distinct mark is pattern, shape or combination of pattern, color and shape, and the box body identity information comprises information of the tag and information of the goods placement mark;

acquire warehouse order information and associate the warehouse order information with the box body identity information to obtain order binding information; and control, according to the order binding information, the interaction terminal of the robot to display an interaction interface comprising the information of the goods placement mark to instruct a picker to pick goods at a corresponding goods position and place the goods at the circulation position according to the goods placement mark;

wherein the processor is configured to execute the instructions to:

control, according to the order binding information, the interaction terminal of the robot to display a picking instruction interaction interface comprising goods position information and goods information to instruct the picker to pick the corresponding goods at the corresponding goods position;

acquire identification information of the corresponding goods and compare the identification information of the corresponding goods with identification information of ordered goods; and in a case where the identification information of the corresponding goods is consistent with the identification information of the ordered goods, switch the picking instruction interaction interface to a placement instruction interaction interface comprising the information of the goods placement mark to instruct the picker to place the corresponding goods at the circulation position at which the displayed goods placement mark is arranged;

wherein the processor is configured to execute the instructions to:

in a case where the identification information of the corresponding goods is inconsistent with the identification information of the ordered goods, switch the picking instruction interaction interface to an abnormal order prompting interaction interface comprising abnormal order prompting information, wherein the processor is configured to execute the instructions to: generate an abnormal order reporting button used for receiving a touch signal or reporting an abnormal order; and control the abnormal order prompting information to be displayed on the reporting button.

* * * * *